United States Patent [19]

Boersma et al.

[11] 4,004,118
[45] Jan. 18, 1977

[54] METAL CLAD MONOPHASE SWITCHGEAR PANELS FOR HIGH VOLTAGES AND POLYPHASE SWITCHING PLANTS CONSISTING OF SUCH SWITCHGEAR PANELS

[75] Inventors: Rintje Boersma, Harmelen; Gijsbert Waldemar Irik, Bilthoven, both of Netherlands

[73] Assignee: COQ B.V., Utrecht, Netherlands

[22] Filed: Mar. 18, 1975

[21] Appl. No.: 559,485

[30] Foreign Application Priority Data

Feb. 13, 1975 Netherlands ............... 7501717

[52] U.S. Cl. ............... 200/148 B; 200/148 D; 317/103
[51] Int. Cl.² ................................. H01H 33/82
[58] Field of Search ............... 317/103, 112; 200/148 R, 148 B, 148 D, 148 E, 303

[56] References Cited

UNITED STATES PATENTS

| 2,891,132 | 6/1959 | Devonshire | 200/303 |
|---|---|---|---|
| 2,933,573 | 4/1960 | Strider | 200/303 |
| 3,171,007 | 2/1965 | Zavertnik | 200/303 |
| 3,497,653 | 2/1970 | Strom | 200/148 B |
| 3,743,804 | 7/1973 | Frowein | 317/103 |
| 3,889,083 | 6/1975 | Guaglione | 200/148 R |

OTHER PUBLICATIONS

B303,011, Jan. 1975, Lieske et al., 317/103.

*Primary Examiner*—Gerald P. Tolin
*Attorney, Agent, or Firm*—Snyder, Brown & Ramik

[57] ABSTRACT

Metal clad switchgear for high voltages comprising monophase switchgear units, in each of which the circuit-breaker is accommodated in a spherical casing and each isolator connected to the circuit-breaker is provided in a substantially tubular casing which is attached to the casing of the circuit-breaker and has its longitudinal axis directed radially or substantially radially to the sphere of the circuit-breaker casing.

10 Claims, 7 Drawing Figures

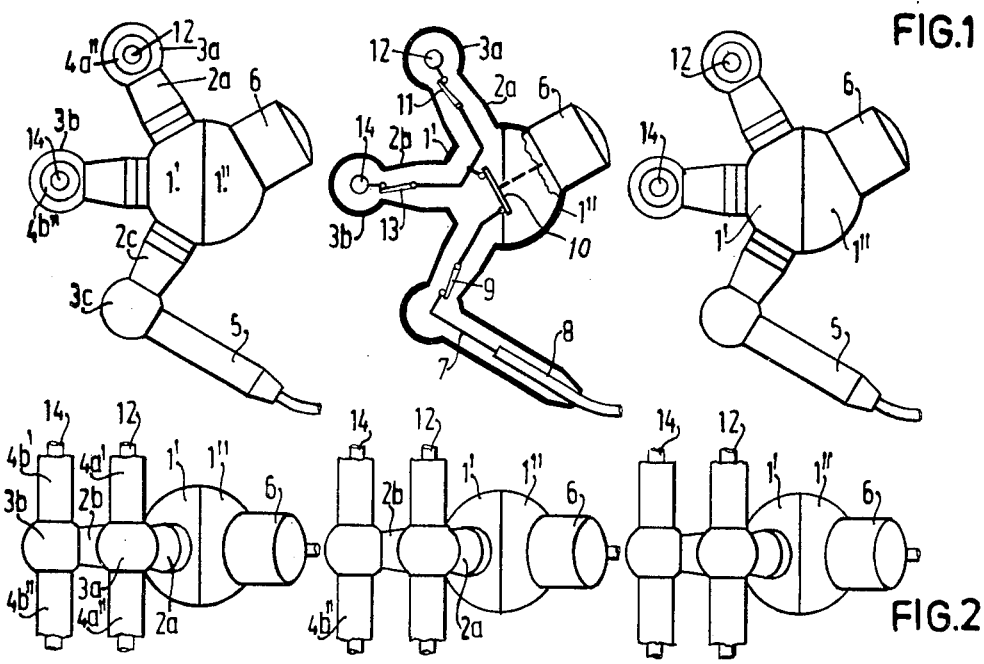
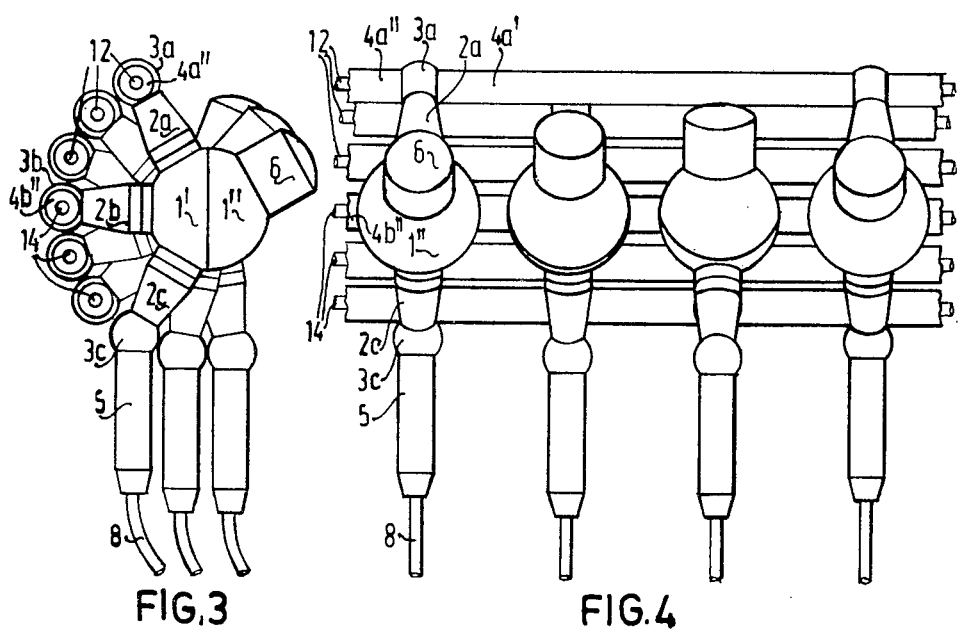

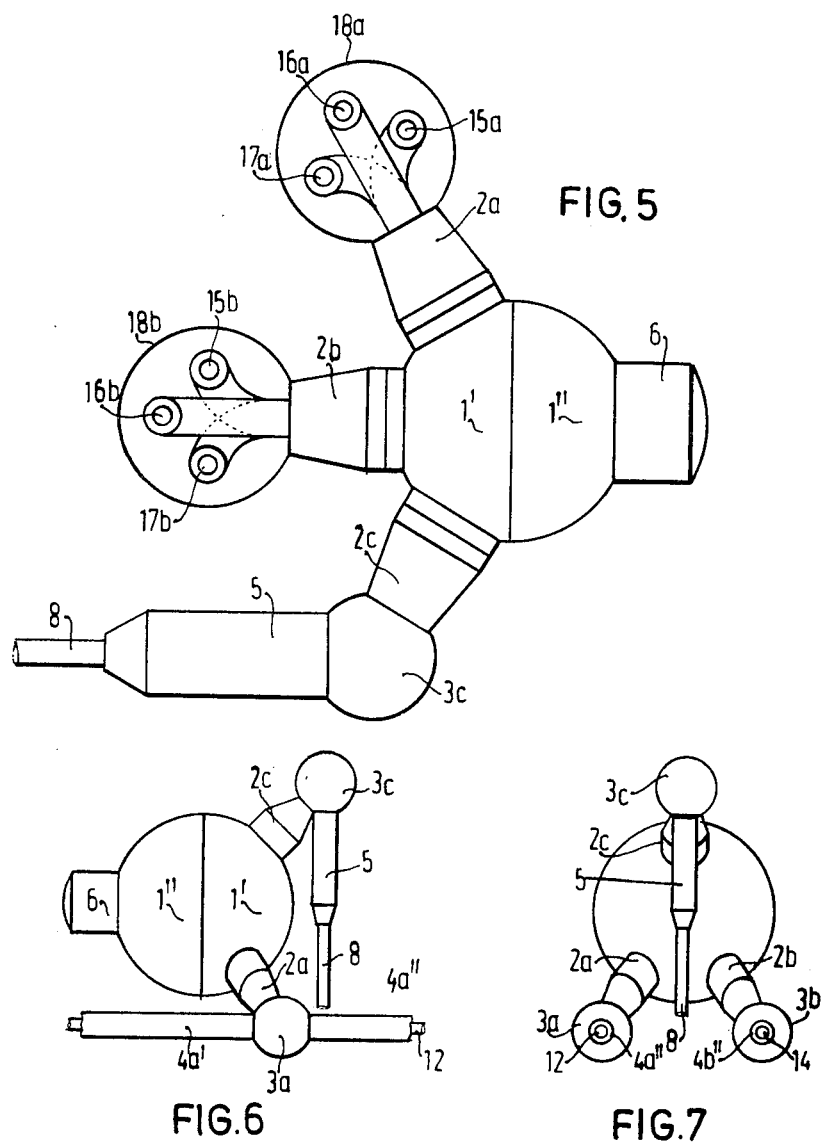

METAL CLAD MONOPHASE SWITCHGEAR PANELS FOR HIGH VOLTAGES AND POLYPHASE SWITCHING PLANTS CONSISTING OF SUCH SWITCHGEAR PANELS

The invention relates to a metal clad monophase switchgear unit for high voltage comprising a closed metal housing, in which a circuit-breaker and at least two isolators connected each with one end to an individual terminal of the circuit-breaker and with the other end to an individual terminal of the switchgear unit are insulatedly accomodated and to which a casing containing driving and/or controlling means for such switches is attached. The invention relates also to a metal clad polyphase switching plant including a plurality of polyphase switchgear assemblies which consist each of a plurality of such monophase switchgear units and phasewise interconnected by conductors forming part of at least one busbar system and insulatedly accommodated in one or more metal tubes.

The invention has the object to provide a switchgear unit of the kind referred to which is appropriate for use in polyphase switching plants and which consists only of a few different elements adapted to be joined in many different ways. The switchgear unit can be constructed without substantial modifications either for the connection of a cable to one or more busbar systems or for the interconnection of busbar systems and can be easily adapted in shape to the circumstances such as the space, the area and/or the height available for the switchgear unit or the plant consisting of polyphase assemblies of such switchgear units. According to the invention this is achieved in that the circuit-breaker is entirely accomodated in a spherical section of the housing and each isolator is mounted in a tubular section of the housing which is attached to and extends with its longitudinal axis in a radial or substantially radial direction with respect to said spherical section, whereas the casing containing the driving and/or controlling means is also fastened to the spherical section of the housing. Due to the spherical shape of the section of the housing accommodating the circuit-breaker the choice of the different directions, in which the isolators extend and by which the shape and the dimensions of the space required for the switchgear unit and the switching plant consisting of polyphase assemblies of such switchgear units are defined, is relatively free.

For a switching plant provided with switchgear units which can be arranged close together in the direction of the busbar systems a construction of each switchgear unit is recommended, in which the tubular sections of the housing extend with their longitudinal axes in the same plane containing the centre of the spherical section of the housing. In that case the monophase switchgear units of each polyphase switchgear assembly can be placed in the switching plant one after the other in a direction transverse to the direction of the conductors of the or each busbar system. Such a switching plant needs a rectangular base area which is relatively short and wide. However, if only a space having a relatively long and narrow base area is available for the accommodation of the switching plant it is advantageous to use a construction, in which all monophase switchgear units of the switching plant lie with the centres of their spherical housing sections on one and the same line parallel with the conductors of the busbar system or systems and in which the monophase switchgear units of each polyphase switchgear assembly are relatively angularly displaced about said line.

Furthermore, the monophase switchgear unit may be constructed in such a manner, that the spherical section of the metal housing surrounding the circuit-breaker consists of two detachably interconnected segments of a sphere, of which one supports the casing containing the driving- and/or controlling means and the other one supports the substantially tubular housing sections accommodating the isolators and projecting radially from said spherical section. Preferably, said segments of the spherical section of the housing then have each the shape of a hemisphere. Owing to this divisibility of the housing the inspection, dismantling and assembly of the circuit-breaker are facilitated, since to open the spherical casing of the circuit-breaker only the segment of the sphere supporting the casing containing the driving and/or controlling means need be removed.

The invention will be further described with reference to the drawing. In this drawing:

FIG. 1 is an elevational view of a threephase switchgear assembly of a switching plant consisting of metal clad monophase switchgear units according to the invention, in which in one of said monophase switchgear units the switches and their connections are diagrammatically shown, FIG. 2 is a plan view of the threephase switchgear assembly illustrated in FIG. 1, FIG. 3 is an elevational view of a variant of the threephase switchgear assembly shown in FIGS. 1 and 2, FIG. 4 is a front view of the threephase switchgear assembly shown in FIG. 3 and a portion of a second threephase switch-gear assembly, FIG. 5 is an elevational view of a metal clad monophase switchgear units according to the invention for a variant of the switching plant illustrated in FIGS. 3 and 4, FIG. 6 is an elevational view of a variant of the metal clad switchgear units shown in FIGS. 1 and 2 and FIG. 7 is a front view of the monophase switchgear unit shown in FIG. 6.

In all figures of the drawing 1', 1", is the spherical metal casing of the circuit-breaker of a metal clad switchgear unit for high voltages. Attached to the outer surface of this casing 1', 1" are radially extending metal tubes 2a, 2b, 2c which each contain an isolator. These tubes are connected at their ends with hollow metal junction spheres 3a, 3b, 3c to each one of which is connected either to pairs of metal tubes 4a', 4a" and 4b', 4b" which surround respective conductors of a busbar system or to a metal cable connection box 5. Mounted on the spherical casing 1', 1" of the circuit-breaker is also a casing 6 containing driving and/or controlling means (not shown).

It appears from the middle figure shown in FIG. 1 that each one of the switchgear units accomodates a connecting conductor 7 for a cable 8, a cable isolator 9, a circuit-breaker 10, a busbar isolator 11, a conductor 12 of a first busbar system, a busbar isolator 13 and a conductor 14 of a second busbar system. The circuit-breaker 10 is entirely accommodated within the spherical casing 1', 1" and the isolators 9, 11, 13 are mounted in the tubes 2a, 2b, 2c projecting radially from the casing 1', 1".

The circuit-breaker 10 and the isolators 9, 11, 13 are only diagrammatically illustrated. Their constructions are not important for the present invention. The bridging switch and the lever switches shown may be replaced by switches having axially movable switching contacts and the circuit-breaker may be a switch with a switching arc which is driven in a closed path by a magnetic field. Furthermore, the switches, that means not only the circuit-breaker but also the isolators, may be constructed for multiple interruption.

The spherical casing of the switchgear unit consists of two detachably interconnected hemispherical sections 1' and 1'', of which section 1' supports the tubes 2a, 2b, 2c containing the isolators, the junction spheres 3a, 3b, 3c and the busbar tubes 4a', 4a'', 4b', 4b'' containing the conductors 12, 14, and section 1'' supports the casing 6 accommodating the driving and/or controlling means.

In FIGS. 1 and 2 the monophase switchgear units of each threephase switchgear assembly of the switching plant are arranged one after the other in a vertical plane transverse to the direction of the conductors of the horizontal busbar systems, so that monophase switchgear units belonging to corresponding phases of adjacent threephase switchgear units come to lie close together.

In the embodiment of the threephase switching plant illustrated in FIGS. 3 and 4 all monophase switchgear panels corresponding to the monophase switchgear units shown in FIGS. 1 and 2 are arranged side by side with the centres of their spherical casings for the circuit-breakers on a straight line which is parallel with the direction of the conductors of the busbar systems. In order to permit the conductors of the busbar systems to extend unobstructedly along the switching plant, the monophase switchgear units belonging to different phases of the plant are relatively angularly displaced through a given angle about the connecting line of the centres of the spherical casings.

FIG. 5 shows that the three conductors 15a, 16a, 17a and 15b, 16b, 17b, respectively, of each busbar system of a three-phase switching plant comprising for instance metal clad mono-phase switchgear units of the construction shown in FIGS. 1, 2 or 3, 4 may also be accommodated in a common tube 18a, 18b, respectively.

Finally FIGS. 6 and 7 illustrate that the tubes 2a, 2b, 2c containing the isolators may also be mounted in quite other directions of the spherical casings 1', 1'' of the circuit-breaker than is shown in FIGS. 1, 2, 3, 4 and 5, so that the switching plant consisting of such monophase switchgear units will assume an entirely different shape. The spherical shape of the casing of the switchgear unit offers the designer a great amount of freedom to design the switching plant, so that he can more easily adapt the plant to the dimensions of the space which is available for the switching plant.

We claim:

1. A metal clad polyphase electric distribution and switching plant comprising a plurality of polyphase assemblies which each consist of a number of monophase switch units, and at least one metal clad polyphase busbar system for the phasewise interconnection of the switch units of said assembly, each switch unit comprising a closed metal casing including a spherical section and at least two tubular sections attached to and extending radially with respect to said spherical section, a circuit-breaker accommodated in said spherical section, an isolator contained in each of said tubular sections of the casing, and a box for the accommodation of means to drive and to control said circuit-breaker and said isolators, said box being also attached to said spherical section, each isolator being connected to a terminal of the circuit-breaker and at least one of said isolators being connected between said circuit-breaker and a conductor of the busbar system.

2. A metal clad polyphase electric distribution and switching plant as claimed in claim 1, in which each one of the monophase switch units has the tubular sections of its casing extending with their longitudinal axes in a common plane containing the center of the spherical section of said casing.

3. A metal clad polyphase electric distribution and switching plant as claimed in claim 1, in which the mono-phase switch units are arranged in a horizontal row at right angles with the conductors of the busbar system.

4. A metal clad polyphase electric distribution and switching plant as claimed in claim 1, in which the monophase switch units are arranged in a horizontal row parallel with the conductors of the busbar system and are angularly displaced one relatively to the other about a line containing the centers of the spherical sections of their casings.

5. A metal clad polyphase electric distribution and switching plant as claimed in claim 1, in which in each monophase switch unit the spherical section of the metal casing consists of two hemisherical shells which are detachably interconnected and one of which carries the circuit-breaker and the box containing the driving and controlling means and to the other one of which all tubular sections of the casing are attached.

6. In an electrical distribution and switching plant, the combination of:
 a series of spaced, parallel busbars, each surrounded by a metal tube; and
 a switchgear unit connected to each busbar, each unit comprising a spherical metal housing having a first tubular section extending radially therefrom and attached to the metal tube surrounding one of said busbars, said housing having a second tubular section extending radially therefrom at a point on said spherical housing spaced from said first tubular section whereby said second tubular section extends in a predetermined direction to a location spaced from said one busbar, a circuit-breaker disposed in said spherical housing, a first isolator located in said first tubular section and a second isolator located in said second tubular section, said first isolator connecting said one busbar to said circuit-breaker and said second isolator also being connected to said circuit breaker, and a box on said spherical housing for accommodating mechanism for operating said circuit-breaker and said isolators.

7. In an electrical distribution and switching plant as defined in claim 6 wherein said series of busbars comprise two sets of polyphase busbars, said first tubular section being connected with the metal tube surrounding a busbar of one set and said second tubular section being connected with the metal tube surrounding a busbar of the other set, with both isolators connecting their respective busbars to said circuit breaker, and each unit including a third tubular section extending radially from said housing in a predetermined direction different from said first and second arms to reach to a selected electrical cable, and a third isolator disposed within said third tubular section and connecting said electrical cable to said circuit breaker.

8. In an electrical distribution and switching plant as defined in claim 7 wherein said spherical housing comprises detachably connected hemispheres, said tubular sections being connected to one hemisphere and said box being connected to the other hemisphere.

9. In an electrical distribution and switching plant as defined in claim 6 wherein said spherical housing comprises detachably connected hemispheres, said tubular sections being connected to one hemisphere and said box being connected to the other hemisphere.

10. In an electrical distribution and switching plant as defined in claim 6 including a set of spaced, parallel cables spaced from and extending in direction generally transverse to the direction of said busbars, each cable having an end portion enclosed by a connection box, and each second tubular section of each unit extending to and being attached to a respective one of said connection boxes, the second isolator connecting the corresponding cable to said circuit-breaker.

* * * * *